United States Patent
Su et al.

(10) Patent No.: US 10,431,944 B1
(45) Date of Patent: Oct. 1, 2019

(54) ELECTRIC VEHICLE CHARGING CONNECTOR ASSEMBLY

(71) Applicant: Cheng Uei Precision Industry Co., Ltd., New Taipei (TW)

(72) Inventors: Yu-Hung Su, New Taipei (TW); Yun-Chien Lee, New Taipei (TW); Jyun Liao, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/116,827

(22) Filed: Aug. 29, 2018

(30) Foreign Application Priority Data

May 31, 2018 (TW) .............................. 107207204 U

(51) Int. Cl.

| H01R 24/86 | (2011.01) |
|---|---|
| H01R 12/71 | (2011.01) |
| H01R 13/631 | (2006.01) |
| H01R 43/20 | (2006.01) |
| H01R 13/26 | (2006.01) |
| H01R 13/52 | (2006.01) |
| B60L 11/18 | (2006.01) |
| H01R 13/187 | (2006.01) |
| H01R 107/00 | (2006.01) |
| H01R 13/73 | (2006.01) |

(52) U.S. Cl.
CPC .......... *H01R 24/86* (2013.01); *B60L 11/1818* (2013.01); *H01R 12/716* (2013.01); *H01R 13/187* (2013.01); *H01R 13/26* (2013.01); *H01R 13/5202* (2013.01); *H01R 13/631* (2013.01); *H01R 43/205* (2013.01); *H01R 13/73* (2013.01); *H01R 2107/00* (2013.01); *H01R 2201/26* (2013.01)

(58) Field of Classification Search
None
See application file for complete search history.

(56) References Cited

U.S. PATENT DOCUMENTS

| 2012/0058687 A1* | 3/2012 | Hsueh | H01R 24/86 439/660 |
| 2014/0302724 A1* | 10/2014 | Ono | H01R 13/4364 439/751 |
| 2017/0054248 A1* | 2/2017 | Moseke | H01R 13/5227 |
| 2017/0149176 A1* | 5/2017 | Kamemura | H01R 13/641 |
| 2017/0210235 A1* | 7/2017 | Lopez | B60L 53/18 |

(Continued)

*Primary Examiner* — Truc T Nguyen
(74) *Attorney, Agent, or Firm* — Cheng-Ju Chiang

(57) ABSTRACT

An electric vehicle charging connector assembly comprises a plug connector and a receptacle connector docking with the plug connector. The plug connector includes a first insulating body, a first circuit board, a plurality of contact terminals, a first electrode unit and a first jumper unit. The receptacle connector includes a second insulating body, a second circuit board, a plurality of docking terminals, a second electrode unit and a second jumper unit. The plurality of the contact terminal of the plug connector and the plurality of the docking terminal of the receptacle connector are respectively assembled with the first circuit board and the second circuit board in an elastically embedded manner so as to simplify manufacture procedures, capable of reducing working time and manufacturing cost as well as suitable for quantity production.

9 Claims, 12 Drawing Sheets

(56) References Cited

U.S. PATENT DOCUMENTS

| | | | | |
|---|---|---|---|---|
| 2017/0229804 A1* | 8/2017 | Kurita | ............... | H01R 13/5202 |
| 2017/0279210 A1* | 9/2017 | Kraemer | ............. | H01R 13/506 |
| 2017/0341523 A1* | 11/2017 | Hirashita | ............ | B60L 11/1818 |
| 2018/0048091 A1* | 2/2018 | Kawai | ................... | H01R 12/65 |
| 2018/0212355 A1* | 7/2018 | Kim | .................. | H01R 13/5205 |
| 2018/0248275 A1* | 8/2018 | Morita | .............. | H01R 13/5213 |
| 2018/0269627 A1* | 9/2018 | Miwa | ..................... | B60L 53/16 |
| 2018/0331475 A1* | 11/2018 | Yin | .................... | H01R 13/6683 |
| 2018/0332726 A1* | 11/2018 | Zhu | ..................... | H01R 13/447 |
| 2019/0067866 A1* | 2/2019 | Moseke | ............. | G01M 3/3272 |
| 2019/0074650 A1* | 3/2019 | Huang | ................. | H01R 31/06 |
| 2019/0109400 A1* | 4/2019 | Takahashi | ............. | H01R 13/42 |

* cited by examiner

ELECTRIC VEHICLE CHARGING CONNECTOR ASSEMBLY

BACKGROUND OF THE INVENTION

1. Field of the Invention

The present invention generally relates to an electrical connector assembly, and more particularly to an electric vehicle charging connector assembly.

2. The Related Art

As known, an electric vehicle charging connector assembly includes a plug connector configured in a charging pile of a charging station and a receptacle connector configured in an electric vehicle. To improve the charging efficiency of the electric vehicle, a kind of electric vehicle charging equipment capable of realizing large-power charge has been developed. Things that conventional electric vehicle charging connector assemblies have in common are that the plug connector and the receptacle connector have respective terminals and circuit boards used for signal transmission wherein the terminals are connected with corresponding circuit boards in a welding manner for a purpose of increasing the connection strength.

In fact, as to the manufacturing process of the welding connection, an additional independent workstation may be necessary for process of certain welding procedures such as flush joint, voiding, clipping or laser welding or etc. However, the additional independent workstation causes long working time and lots of material consumption and makes manufacturing costs increase, which has no benefit in quantity production.

SUMMARY OF THE INVENTION

An object of the present invention is to provide an electric vehicle charging connector assembly comprising a plug connector and a receptacle connector docking with the plug connector. The plug connector includes a first insulating body, a first circuit board, a plurality of contact terminals, a first electrode unit and a first jumper unit. The first insulating body has a first outer ring base and a first inner ring base inside the first outer ring base. The first inner ring base protrudes towards the first outer ring base to form a plurality of columns extending longitudinally. Each two of the plurality of the columns define a guiding groove therebetween. The first circuit board is disposed at a side of the first insulating body and has a plurality of first through holes. Each of the plurality of the first through holes is located corresponding to the guiding groove. The first circuit board has a plurality of first wire holes and a plurality of first wires penetrating through the plurality of the first wire holes. Each of the plurality of the contact terminals has a first main section and a first fixed section. The first main section is inserted in the guiding groove. The first fixed section integrally extends from the first main section and is inserted in each of the plurality of the first through holes of the first circuit board. The first electrode unit includes a first conducting sleeve and a second conducting sleeve. The first conducting sleeve is positively charged, the second conducting sleeve is negatively charged. The first jumper unit is electrically connected with the first electrode unit and includes a first jumper body and a second jumper body. The receptacle connector includes a second insulating body, a second circuit board, a plurality of docking terminals, a second electrode unit and a second jumper unit. The second insulating body has a second outer ring base. An inner side of the second outer ring base is defined with an outer ring groove. A retaining wall rises from a middle of the outer ring groove. The retaining wall extends laterally to form a stair surface. A plurality of slits are disposed on the stair surface. The second circuit board is disposed at a side of the second insulating body and has a plurality of second through holes located corresponding to the plurality of the slits and has a plurality of second wire holes and a plurality of second wires penetrating through the plurality of the second wire holes. Each of the plurality of the docking terminals has a second main section and a second fixed section. The second main section abuts on the retaining wall. The second fixed section integrally extends from the second main section and is inserted in each of the plurality of the second through holes of the second circuit board through each of the plurality of the slits. The second electrode unit includes a third conducting sleeve and a fourth conducting sleeve. The third conducting sleeve is negatively charged. The fourth conducting sleeve is positively charged. The second jumper unit is electrically connected with the second electrode unit and includes a third jumper body and a fourth jumper body.

As described above, the plurality of the contact terminal 24 of the plug connector 2 and the plurality of the docking terminal 34 of the receptacle connector 3 are respectively assembled with the first circuit board 22 and the second circuit board 32 in an elastically embedded manner so as to simplify manufacture procedures, capable of reducing working time and manufacturing cost as well as suitable for quantity production.

Accordingly, the first fixed section has two first elastic arms and a first hollow portion located between the two first elastic arms. The two first elastic arms and the first hollow portion corporately provide the first fixed section with an elasticity of compression to make the first fixed section penetrate though and fasten to each of the plurality of the first through holes of the first circuit board. The second fixed section has two second elastic arms and a second hollow portion located between the two second elastic arms. The two second elastic arms and the second hollow portion corporately provide the second fixed section with an elasticity of compression to make the second fixed section penetrate though and fasten to each of the plurality of the second through holes of the second circuit board.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
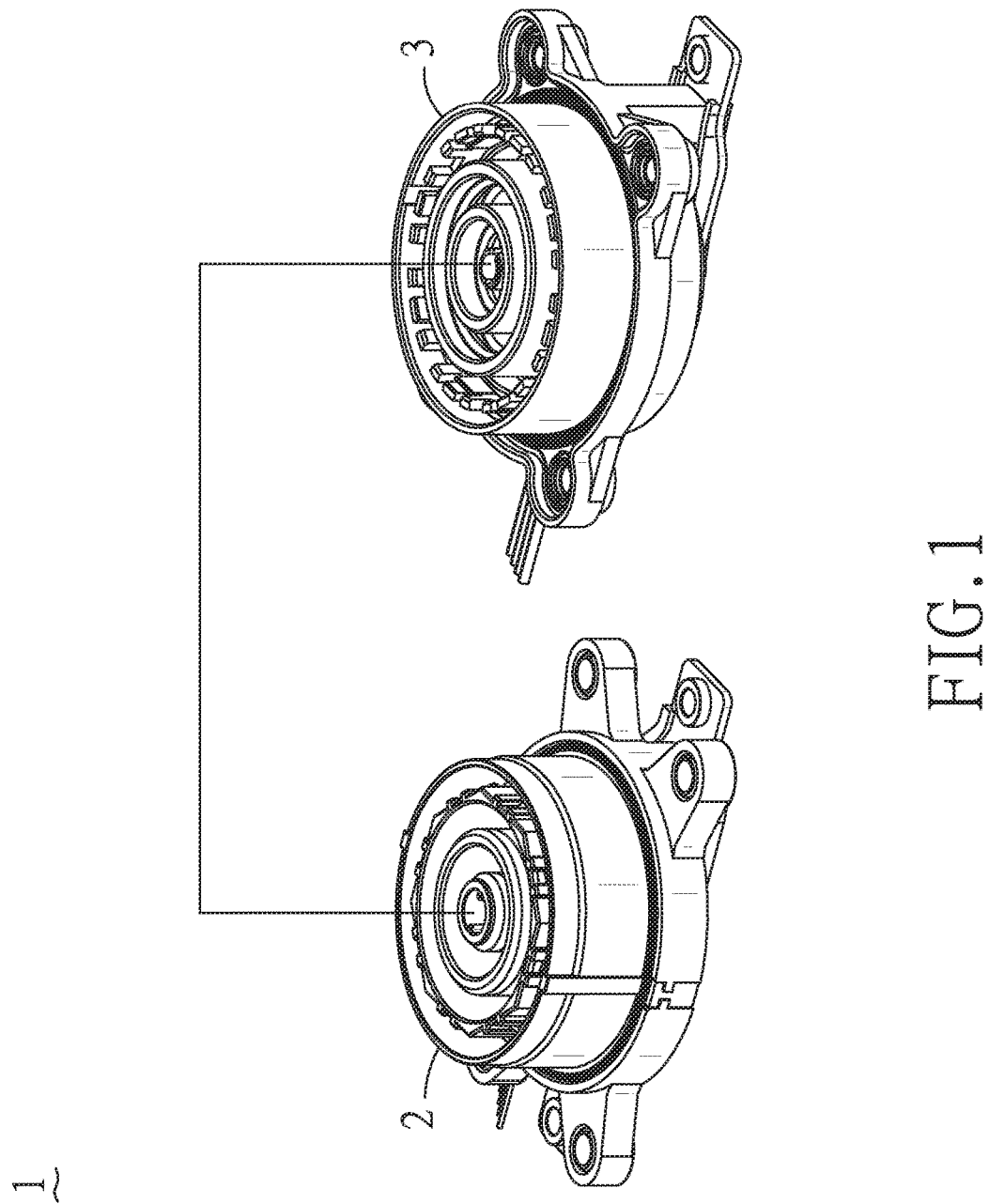
FIG. 1 is an exploded perspective view of an electric vehicle charging connector assembly in accordance with the present invention showing a plug connector is docking with a receptacle connector.
Figure 1A:
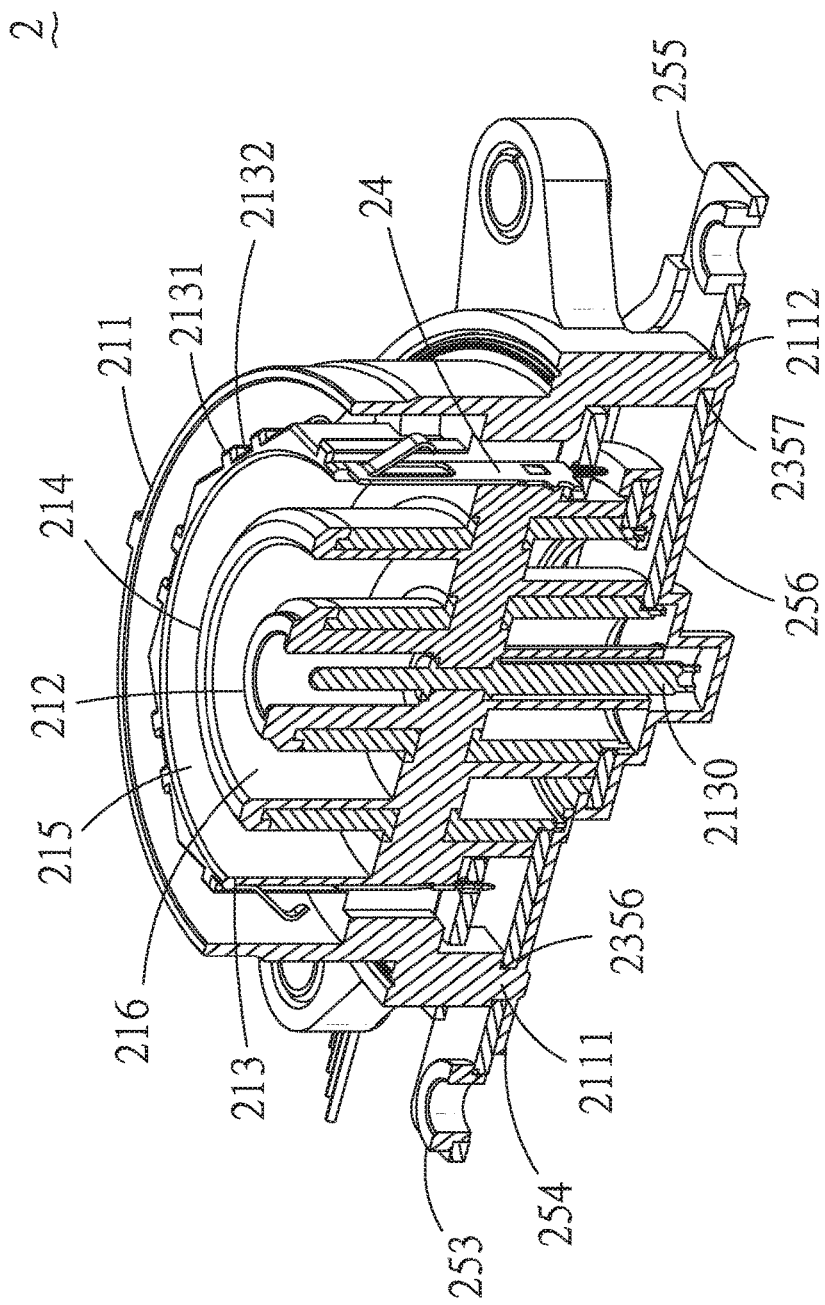
FIG. 1A is a cross-sectional view of the plug connector of the electric vehicle charging connector assembly in accordance with the present invention.
Figure 1B:
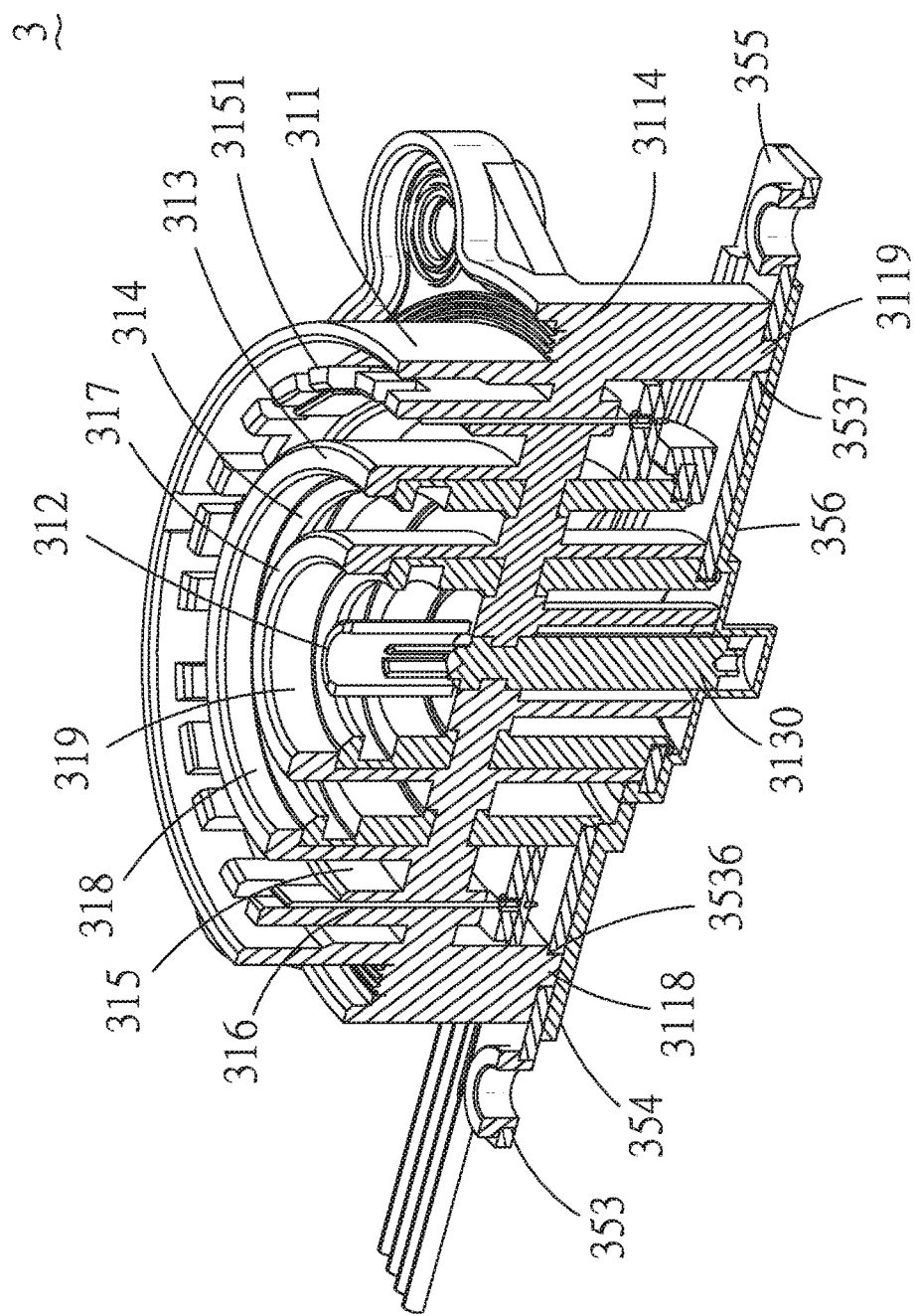
FIG. 1B is a cross-sectional view of the receptacle connector of the electric vehicle charging connector assembly in accordance with the present invention.
Figure 2:
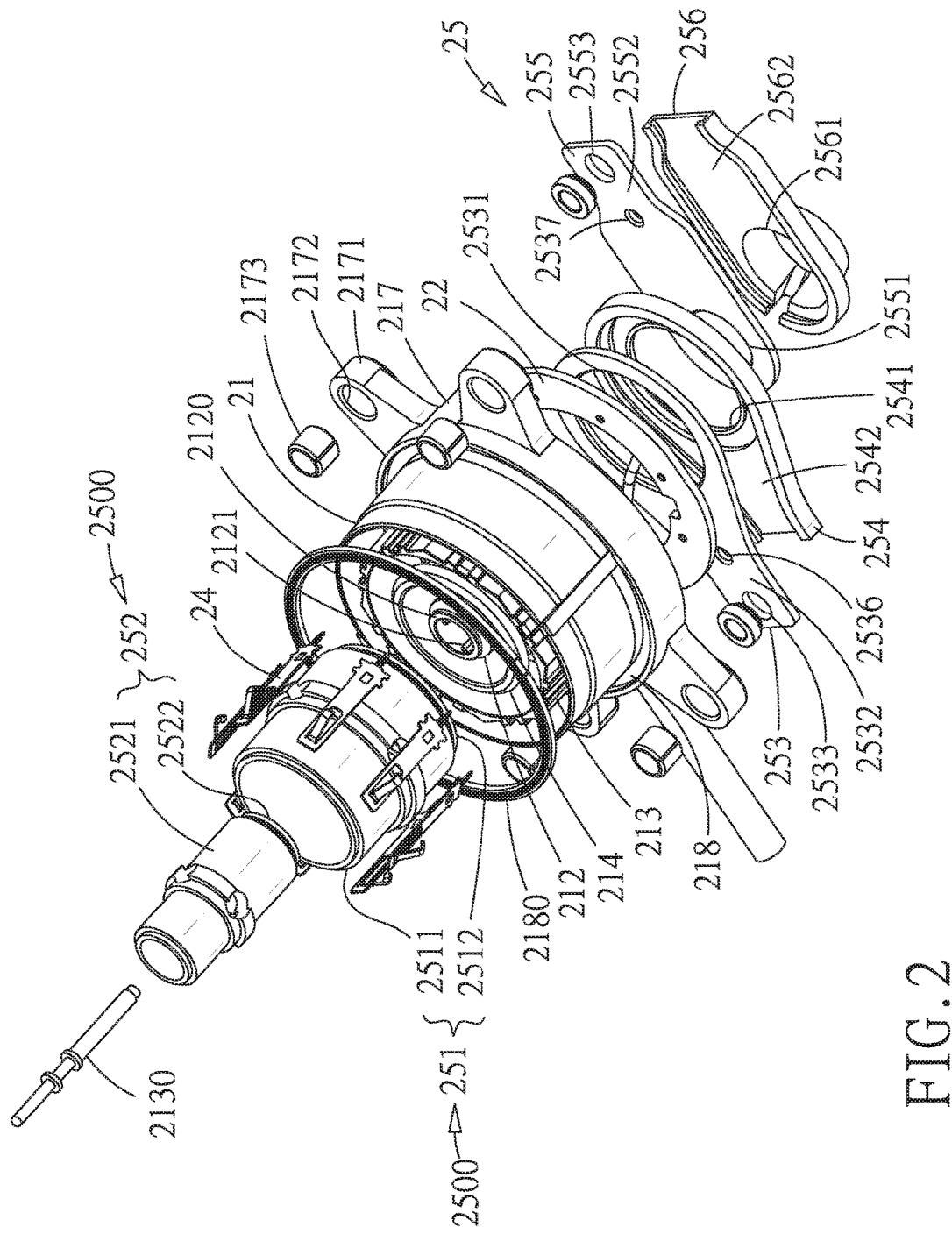
FIG. 2 is an exploded perspective view of the plug connector of FIG. 1A.
Figure 3A:
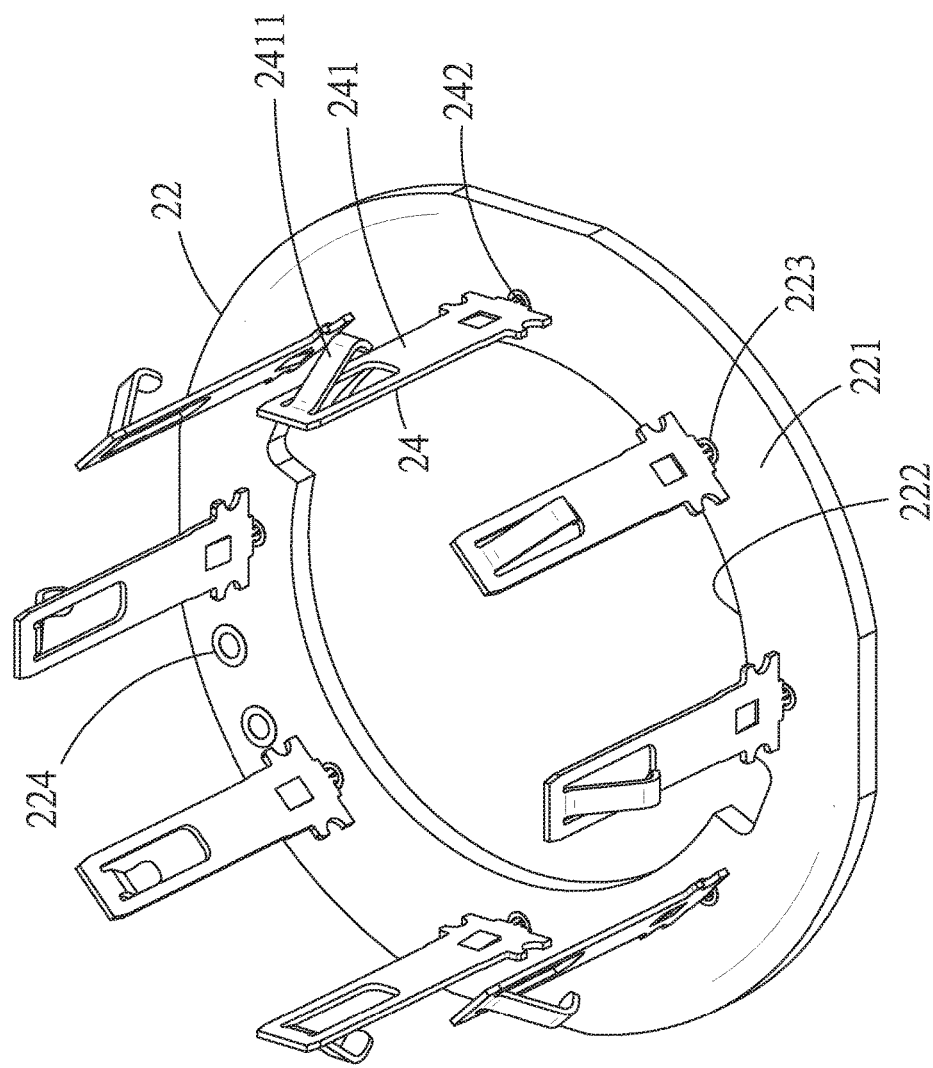
FIG. 3A is a schematic perspective view showing a first circuit board and a plurality of contact terminals of the plug connector are assembled.
Figure 3B:
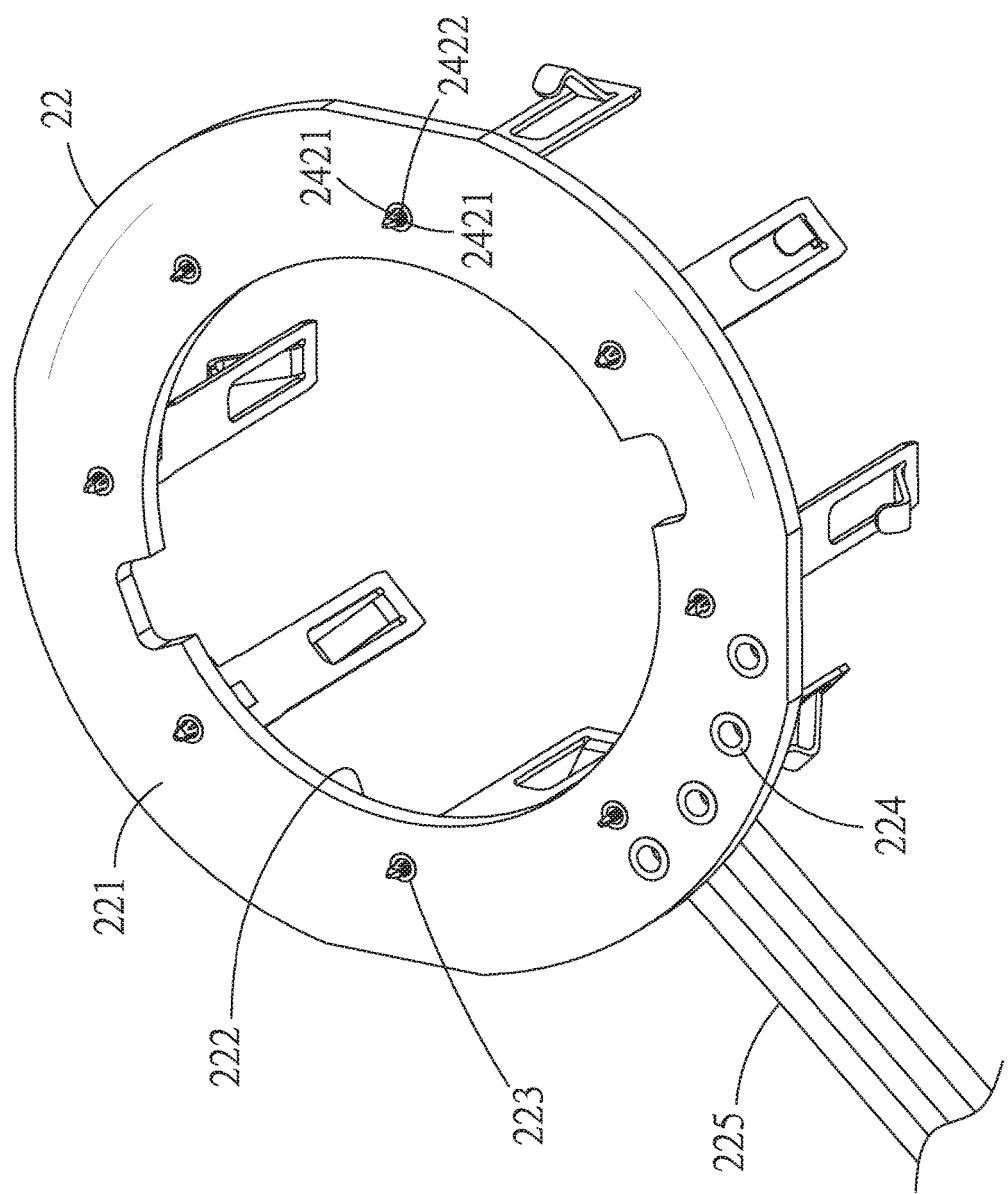
FIG. 3B is a schematic perspective view from another angle of FIG. 3A.
Figure 3C:
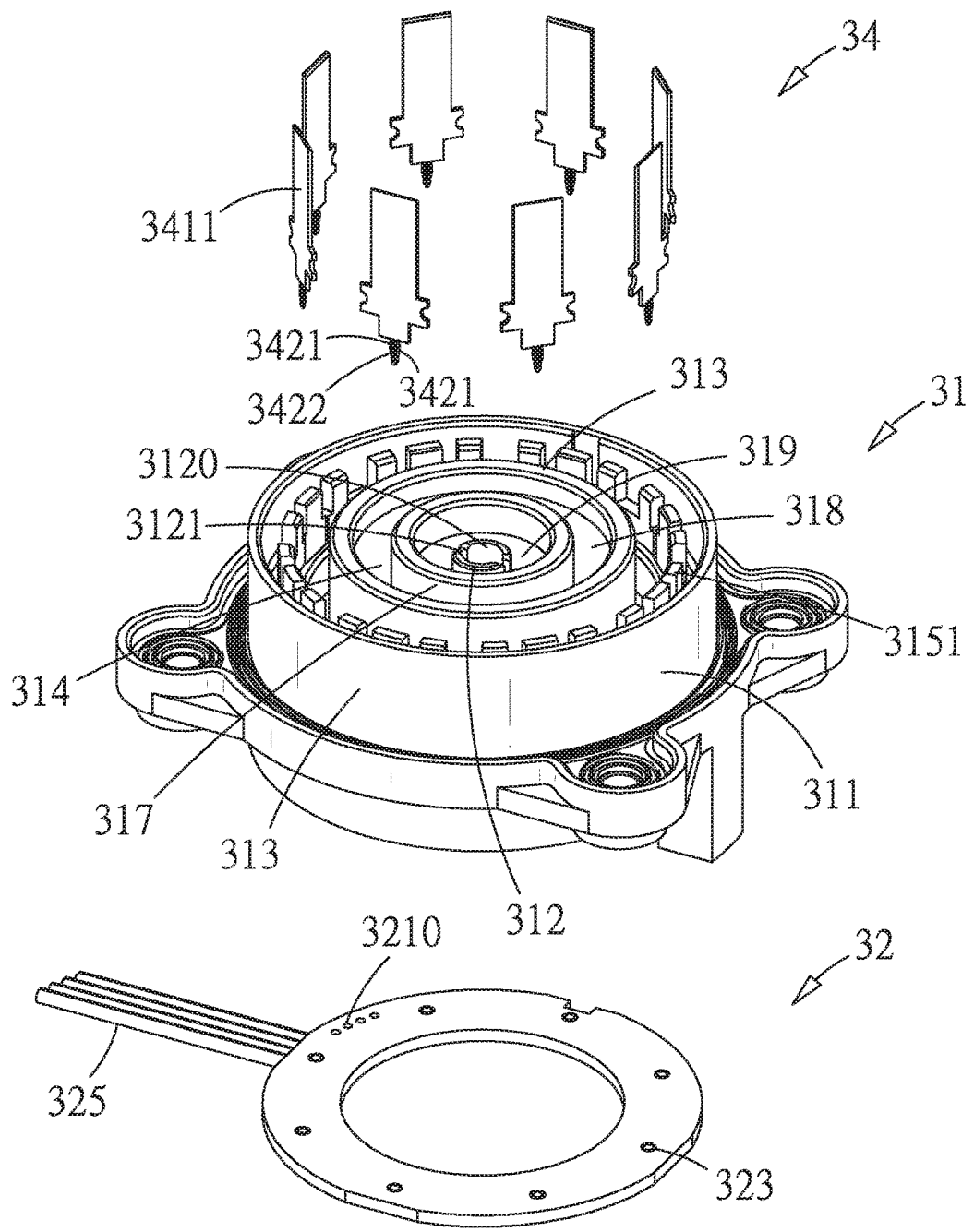
FIG. 3C is a schematic perspective view showing a second circuit board, a plurality of docking terminals and a second insulating body of the plug connector are assembled.
Figure 4:
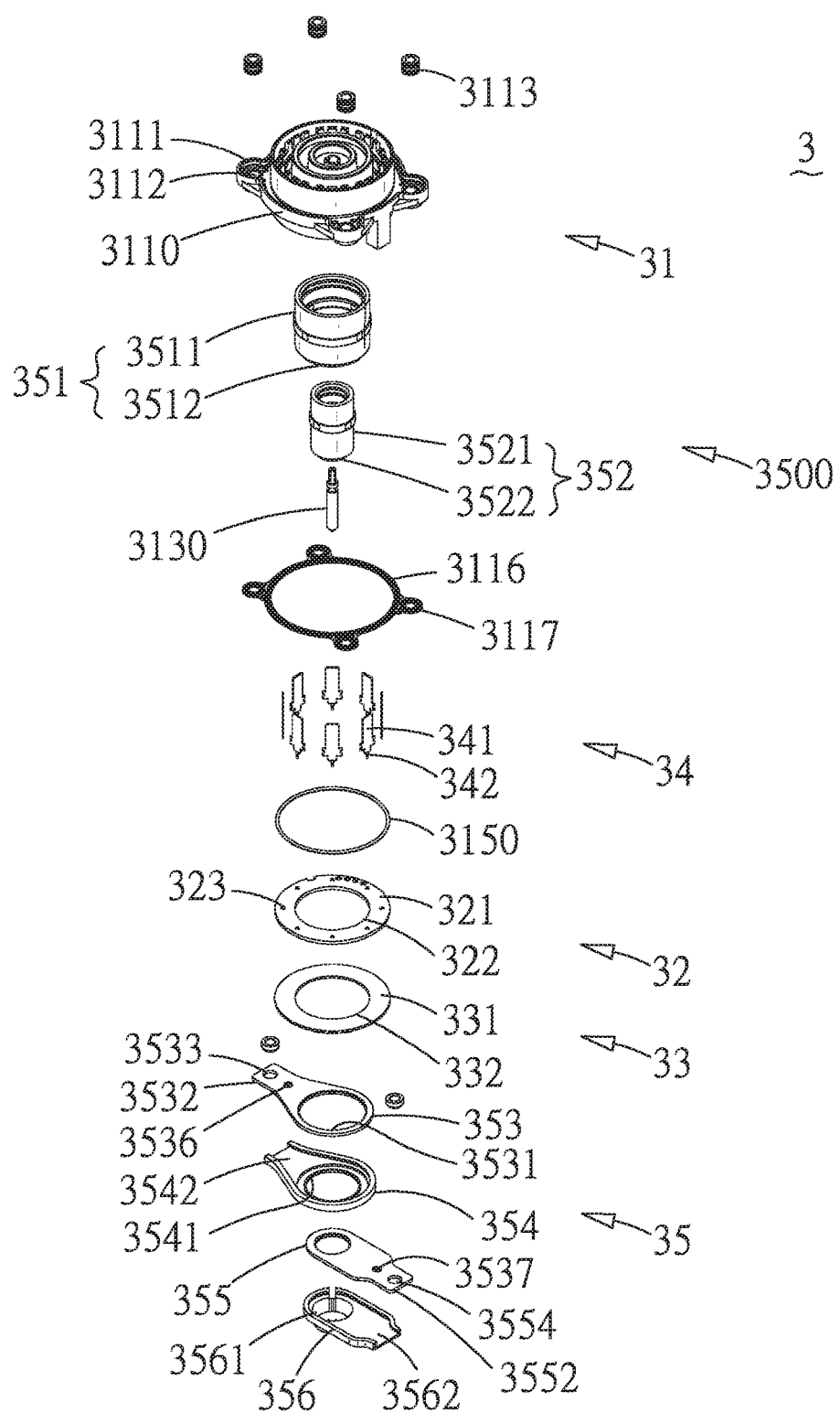
FIG. 4 is an exploded perspective view of the receptacle connector of FIG. 1B.
Figure 5:
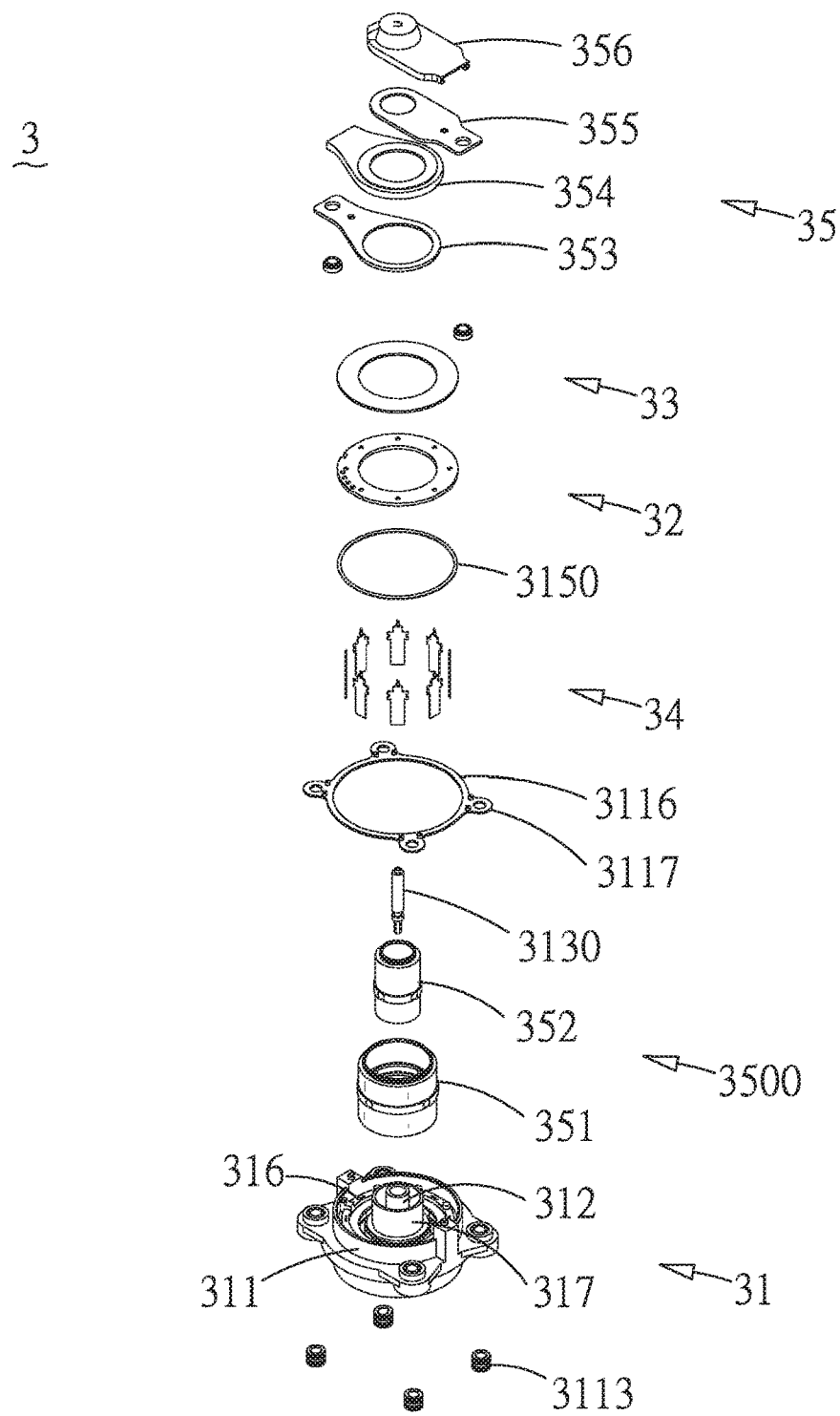
FIG. 5 is an exploded perspective view from another angle of FIG. 4.
Figure 6:
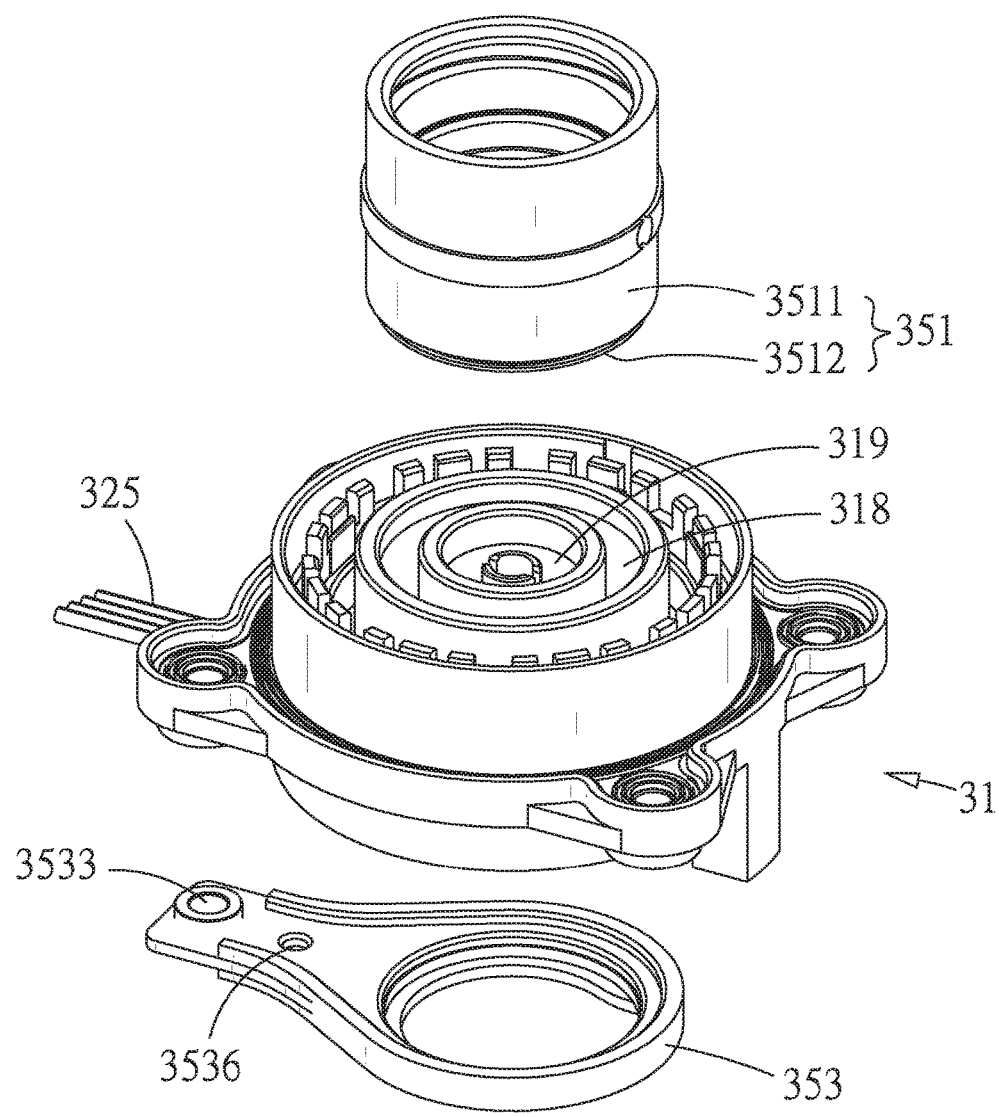
FIG. 6 is a schematic perspective view showing a third conducting sleeve and a third jumper body of the receptacle connector are assembled.
Figure 7:
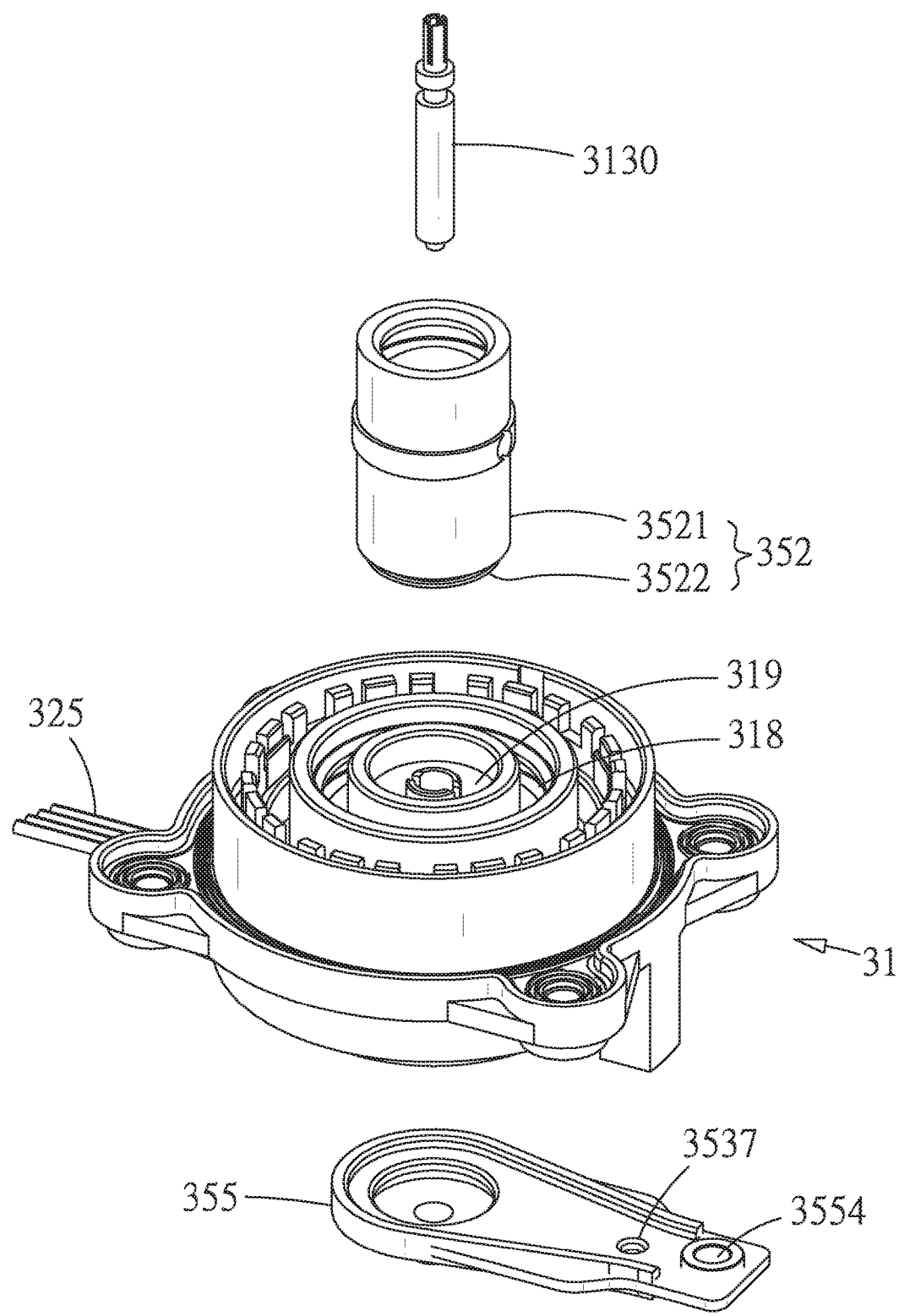
FIG. 7 is a schematic perspective view showing a fourth conducting sleeve and a fourth jumper body of the receptacle connector are assembled.

With reference to FIG. 1, an electric vehicle charging connector assembly 1 in accordance with the present invention is shown. The electric vehicle charging connector assembly 1 includes a plug connector 2 and a receptacle connector 3 docking with the plug connector 2.

With reference to FIG. 1A, FIG. 2, FIG. 3A and FIG. 3B, the plug connector 2 configured in a charging pile of a charging station, comprises a first insulating body 21, a first circuit board 22, a plurality of contact terminals 24, a first electrode unit 2500 and a first jumper unit 25. The first insulating body 21 has a first outer ring base 211 and a first axle stand 212 extending along a center axis of the first outer ring base 211. The first axle stand 212 has a first top opening 2120. An inner wall of the first top opening 2120 protrudes inward to form a limiting pillar 2121. A first ground element 2130 is inserted in the first axle stand 212 through the first top opening 2120. The first insulating body 21 has a first inner ring base 213 located between the first axle stand 212 and the first outer ring base 211. The first inner ring base 213 protrudes towards the first outer ring base 211 to form a plurality of columns 2131 extending longitudinally. Each two of the plurality of the columns 2131 define a guiding groove 2132 therebetween. In this preferred embodiment, the first inner ring base 213 has eight guiding grooves 2132 at a certain interval in a circumference direction along the first outer ring base 211. In practice, there may be an arbitrary amount of the guiding groove 2132 without being limited to the amount of the guiding groove 2132 described in the preferred embodiment of the present invention. The first insulating body 21 has a first annular wall 214 located between the first outer ring base 211 and the first inner ring base 213. A first engaging groove 215 is defined between the first annular wall 214 and the first inner ring base 213. A second engaging groove 216 is defined between the first annular wall 214 and the first axle stand 212. Two opposite sides of the first outer ring base 211 extend longitudinally to form a first positioning pillar 2111 and a second positioning pillar 2112. The first outer ring base 211 extends outward to form a first extension base 217. The first extension base 217 further extends outward in four directions to form four first support arms 2171. A free end of each of the four first support arms 2171 has a first mounting hole 2172 adapted for external connections. The first mounting hole 2172 may be partially filled with a first gasket 2173 for facilitating the external connections. A first circular recess 218 is defined between the first extension base 217 and the first outer ring base 211 and may be filled with a first elastic ring 2180 for mechanical seal.

The first circuit board 22 is disposed at a side of the first insulating body 21. The first circuit board 22 has a first circular plate 221 and a first axial hole 222 located at a center of the first circular plate 221. An inner wall of the first axial hole 222 abuts on an outside of the first annular wall 214. The first circular plate 221 has a plurality of first through holes 223 located corresponding to the guiding grooves 2132. In this preferred embodiment, there are eight guiding grooves 2132 and correspondingly eight first through holes 223. Further, the first circular plate 221 opens a plurality of first wire holes 224. The plurality of the first wire holes 224 provide a plurality of first wires 225 to get through for signal transmission. In this preferred embodiment, there are four first wire holes 224 and correspondingly four first wires 225.

The plurality of the contact terminals 24 are used for signal transmission. In this preferred embodiment, there are eight contact terminals 24, corresponding to the amount of the guiding grooves 2132. Each two of the eight contact terminals 24 are combined as one to electrically connect to each of the plurality of the first wires 225. Each of the plurality of the contact terminals 24 has a first main section 241 and a first fixed section 242. The first main section 241 is inserted in the guiding groove 2132. The first fixed section 242 integrally extends from the first main section 241 and is inserted in each of the plurality of the first through holes 223 of the first circuit board 22. The first fixed section 242 has two first elastic arms 2421 and a first hollow portion 2422 located between the two first elastic arms 2421. The two first elastic arms 2421 and the first hollow portion 2422 corporately provide the first fixed section 242 with an elasticity of compression to make the first fixed section 242 penetrate though and fasten to each of the plurality of the first through holes 223 of the first circuit board 22. Further, the first main section 241 extends in an inclined direction towards the first outer ring base 211 to form a contact leg 2411.

The first electrode unit 2500 includes a first conducting sleeve 251 and a second conducting sleeve 252. The first conducting sleeve 251 is positively charged and has a first cylinder 2511 and a first flange 2512. The first cylinder 2511 is inserted in the first engaging groove 215. The first flange 2512 extends from the first cylinder 2511 and projects beyond the first circuit board 22. The second conducting sleeve 252 is negatively charged and has a second cylinder 2521 and a second flange 2522. The second cylinder 2521 is inserted in the second engaging groove 216. The second flange 2522 extends from the second cylinder 2521 and projects beyond the first flange 2512.

The first jumper unit 25 is electrically connected with the first electrode unit 2500 and includes a first jumper body 253, a first insulating bush 254, a second jumper body 255 and a second insulating bush 256. The first jumper body 253 has a first body hole 2531 and a first body handle 2532. The first body hole 2531 receives a part of the first flange 2512, and the other part of the first flange 2512 is riveted along an edge of the first body hole 2531 to secure the first jumper body 253 on the first conducting sleeve 251. The first body handle 2532 extends laterally towards a side of the first insulating body 21 and has a first positioning hole 2536 located corresponding to the first positioning pillar 2111. An extended end of the first body handle 2532 has a first conductive joint hole 2533. The first insulating bush 254 is arranged on an outside of the first jumper body 253 and has a first bush hole 2541 located corresponding to the first body hole 2531 and a first bush handle 2542 located corresponding to the first body handle 2532. The first bush handle 2542 is partially arranged on the first body handle 2532 to allow the first conductive joint hole 2533 to be exposed. The second jumper body 255 has a second body hole 2551 and a second body handle 2552. The second body hole 2551 receives a part of the second body handle 2522, and the other part of the second flange 2522 is riveted along an edge of the second body hole 2551 to secure the second jumper body 255 on the second conducting sleeve 252. The second body handle 2552 extends laterally towards another side of the first insulating body 21 and has a second positioning hole 2537 located corresponding to the second positioning pillar 2112. An extended end of the second body handle 2552 has a second conductive joint hole 2553. The second insulating bush 256 is arranged on an outside of the second jumper body 255 and has a second bush hole 2561 located corresponding to the second body hole 2551 and a second bush handle 2562 located corresponding to the second body handle 2552. The second bush handle 2562 is partially arranged on the second body handle 2552 to allow the second conductive joint hole 2553 to be exposed. The first conductive joint hole 2533 and the second conductive joint hole 2553 are adapted to electrically connect to relative jumpers inside a charging pile of the charging station (not shown).

With reference to FIG. 1B, FIG. 3C, FIGS. 4 to 7, the receptacle connector 3 configured on a battery of an electric vehicle, comprises a second insulating body 31, a second circuit board 32, a waterproof ring 33, a plurality of docking terminals 34, a second electrode unit 3500 and a second jumper unit 35. The second insulating body 31 has a second outer ring base 311 and a second axle stand 312 extending along a center axis of the second outer ring base 311. The second axle stand 312 has a second top opening 3120. An inner wall of the second top opening 3120 recesses to form a limiting groove 3121. A second ground element 3130 is inserted in the second axle stand 312 through the second top opening 3120. The second insulating body 31 has a second inner ring base 313 located between the second axle stand 312 and the second outer ring base 311. An inner ring groove 314 is defined between the second inner ring base 313 and the second axle stand 312. An outer ring groove 315 is defined between the second inner ring base 313 and the second outer ring base 311. A retaining wall 3151 rises from a middle of the outer ring groove 315. The retaining wall 3151 extends laterally to form a stair surface where a plurality of slits 316 are disposed at a certain interval long a circumference direction. In practice, there may be an arbitrary amount of the plurality of the slits 316 without being limited to the amount of the plurality of the slits 316 described in the preferred embodiment of the present invention above. The second insulating body 31 has a second annular wall 317 located between the second axle stand 312 and the second inner ring base 313. A third engaging groove 318 is defined between the second annular wall 317 and the second inner ring base 313. A fourth engaging groove 319 is defined between the second annular wall 317 and the second axle stand 312. Two opposite sides of the second outer ring base 311 extend longitudinally to form a third positioning pillar 3118 and a fourth positioning pillar 3119. The second outer ring base 311 extends outward to form a second extension base 3110. The second extension base 3110 further extends outward in four directions to form four second support arms 3111. A free end of each of the four second support arms 3111 has a second mounting hole 3112 adapted for external connections. The second mounting hole 3112 may be partially filled with a second gasket 3113 for facilitating the external connections. A second circular recess 3114 is defined between the second extension base 3110 and the second outer ring base 311 and may be filled with a second elastic ring 3116 for mechanical seal. The second elastic ring 3116 has circular pieces 3117 each extending integrally towards the second mounting hole 3112 and covering an edge of the second mounting hole 3112.

The second circuit board 32 is disposed at a side of the second insulating body 31 with respect to the first circuit board 22. The second circuit board 32 has a second circular plate 321 and a second axial hole 322 located at a center of the second circular plate 321. An inner wall of the second axial hole 322 abuts on an outside of the second annular wall 317. The second circular plate 321 has a plurality of second through holes 323 located corresponding to the plurality of the slits 316. In this preferred embodiment, there are eight slits 316 and correspondingly eight second through holes 323. Further, the second circular plate 321 opens a plurality of second wire holes 3210. The plurality of the second wire holes 3210 provide a plurality of second wires 325 to get through for signal transmission. In this preferred embodiment, there are four second wire holes 3210 and correspondingly four second wires 325.

The waterproof ring 33 is disposed at an outside of the second circuit board 32 and has a ring portion 331 and a central hole 332 located at a center of the ring portion 331. An inner wall of the central hole 332 abuts on an outside of the second annular wall 317, and an outside wall of the ring portion 331 abuts on an inside of the ring portion 311 so that the second circuit board 32 is entirely closed to an outside of the receptacle connector 3.

The plurality of the docking terminals 34 are used for signal transmission. In this preferred embodiment, there are eight docking terminals 34 corresponding to the amount of the plurality of the slits 316. Each two of the eight docking terminals 34 are combined as one to electrically connect to each of the plurality of the second wires 325. Each of the plurality of the docking terminals 34 has a second main section 341 and a second fixed section 342. The second main section 341 abuts on the retaining wall 3151 and the second fixed section 342 integrally extends from the second main section 341 and is inserted in each of the plurality of the second through holes 323 of the second circuit board 32 through each of the plurality of the slits 316. The second fixed section 342 has two second elastic arms 3421 and a second hollow portion 3422 located between the two second elastic arms 3421. The two second elastic arms 3421 and the second hollow portion 3422 corporately provide the second fixed section 342 with an elasticity of compression to make the second fixed section 342 penetrate though and fasten to each of the plurality of the second through holes 323 of the second circuit board 32. Further, the second main section 341 has a contact surface 3411 in contact with the contact leg 2411 of the contact terminal 24. The second electrode unit 3500 includes a third conducting sleeve 351 and a fourth conducting sleeve 352. The third conducting sleeve 351 is negatively charged and has a third cylinder 3511 and a third flange 3512. The third cylinder 3511 is inserted in the third engaging groove 318. The third flange 3512 extends from the third cylinder 3511 and projects beyond the second circuit board 32. The fourth conducting sleeve 352 is positively charged and has a fourth cylinder 3521 and a fourth flange 3522. The fourth cylinder 3521 is inserted in the fourth engaging groove 319. The fourth flange 3522 extends from the fourth cylinder 3521 and projects beyond the third flange 3512.

The second jumper unit 35 is electrically connected with the second electrode unit 3500 and includes a third jumper body 353, a third insulating bush 354, a fourth jumper body 355 and a fourth insulating bush 356. The third jumper body 353 has a third body hole 3531 and a third body handle 3532. The third body hole 3531 receives a third flange 3512, and the other part of the third flange 3512 is riveted along an edge of the third body hole 3531 to secure the third jumper body 353 on the third conducting sleeve 351. The third body handle 3532 extends laterally towards a side of the second insulating body 31 and has a third positioning hole 3536 located corresponding to the third positioning pillar 3118. An extended end of the third body handle 3532 has a third conductive joint hole 3533. The third insulating bush 354 is arranged on an outside of the third jumper body 353 and has a third bush hole 3541 located corresponding to the third body hole 3531 and a third bush handle 3542 located corresponding to the third body handle 3532. The third bush handle 3542 is partially arranged on the third body handle 3532 to allow the third conductive joint hole 3533 to be exposed. The fourth jumper body 355 has a fourth body hole 3551 and a fourth body handle 3552. The fourth body hole 3551 receives a part of the fourth flange 3522, and the other part of the fourth flange 3522 is riveted along an edge of the fourth body hole 3551 to secure the fourth jumper body 355 on the fourth conducting sleeve 352. The fourth body handle 3552 extends laterally towards another side of the second insulating body 31 and has a fourth positioning hole 3537 located corresponding to the fourth positioning pillar 3119. An extended end of the fourth body handle 3552 has a fourth conductive joint hole 3554. The fourth insulating bush 356 is arranged on an outside of the fourth jumper body 355 and has a fourth bush hole 3561 located corresponding to the fourth body hole 3551 and a fourth bush handle 3562 located corresponding to the fourth body handle 3552. The fourth bush handle 3562 is partially arranged on the fourth body handle 3552 to allow the fourth conductive joint hole 3554 to be exposed. The third conductive joint hole 3533 and the fourth conductive joint hole 3554 are adapted to electrically connect to relative jumpers inside the charging pile of the charging station (not shown).

In assembly of the first electrode unit 2500 and the first jumper unit 25, the first positioning pillar 2111 of the first insulating body 21 is inserted into the first positioning hole 2536 of the first jumper body 253 to preliminarily secure the first jumper body 253 on the first conducting sleeve 251 of the first electrode unit 2500, and then the first flange 2512 of the first conducting sleeve 251 is riveted along an edge of the first body hole 2531 to totally secure the first jumper body 253 on the first conducting sleeve 251 of the first electrode unit 2500. The second positioning pillar 2112 of the first insulating body 21 is inserted into the first positioning hole 2536 of the first jumper body 253 to preliminarily secure the first jumper body 253 on the second conducting sleeve 252 of the first electrode unit 2500, and then the second flange 2522 of the second conducting sleeve 252 is riveted along an edge of the second body hole 2551 to totally secure the second jumper body 255 on the second conducting sleeve 252 of the first electrode unit 2500.

Similarly, in assembly of the second electrode unit 3500 and the second jumper unit 35, the third positioning pillar 3118 of the second insulating body 31 is inserted into the third positioning hole 3536 of the third jumper body 353 to preliminarily secure the third jumper body 353 on the third conducting sleeve 351 of the second electrode unit 3500, and then the third flange 3512 of the third conducting sleeve 351 is riveted along an edge of the third body hole 3531 to totally secure the third jumper body 353 on the third conducting sleeve 351 of the second electrode unit 3500. The fourth positioning pillar 3119 of the second insulating body 31 is inserted into the fourth positioning hole 3537 of the fourth jumper body 355 to preliminarily secure the fourth jumper body 355 on the fourth conducting sleeve 352 of the second electrode unit 3500, and then the fourth flange 3522 of the fourth conducting sleeve 352 is riveted along an edge of the fourth body hole 3551 to totally secure the fourth jumper body 355 on the fourth conducting sleeve 352 of the second electrode unit 3500.

Figure 8:
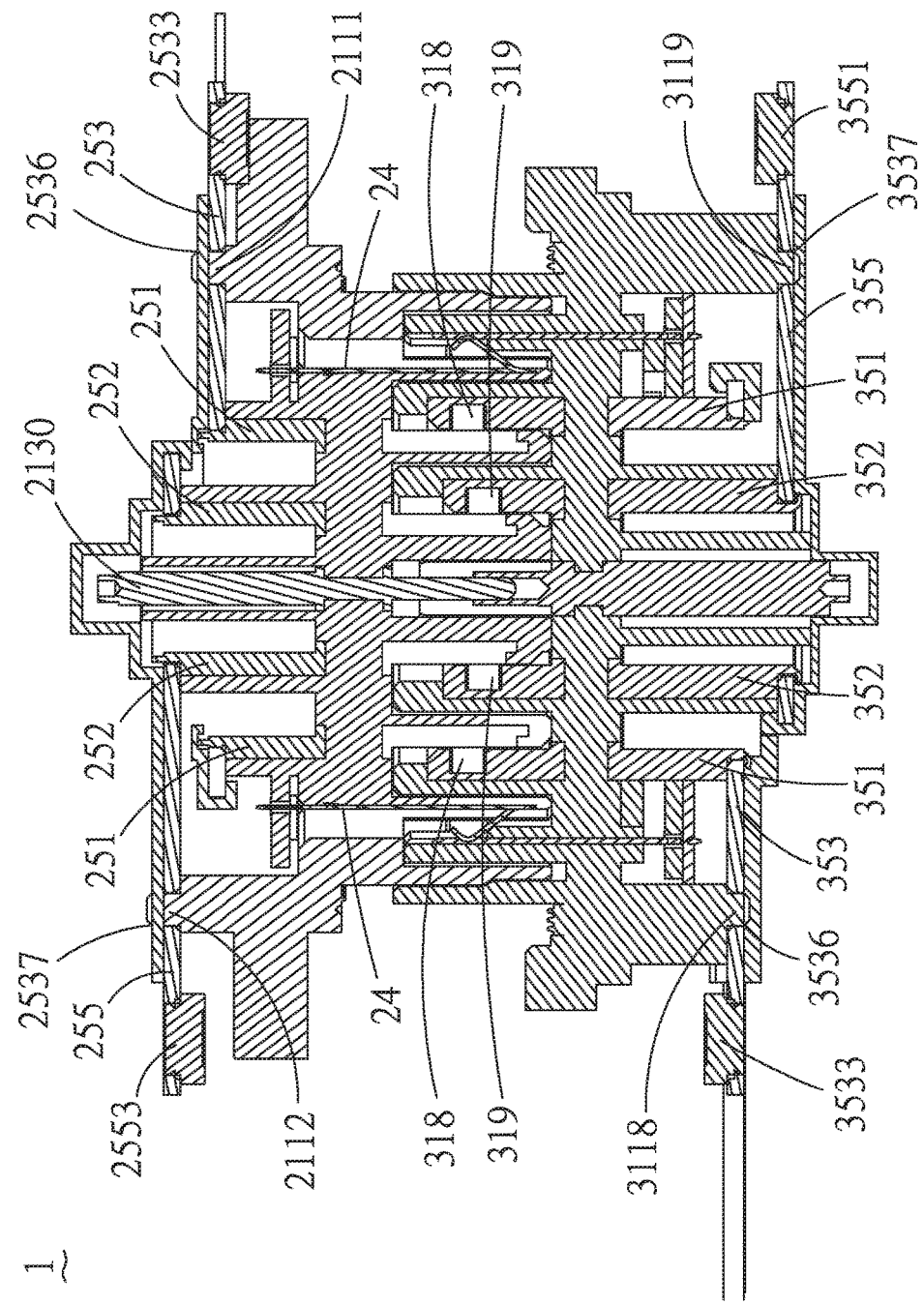
FIG. 8 is a cross-sectional view of the electric vehicle charging connector assembly in accordance with the present invention showing the plug connector is docking with the receptacle connector.

With reference to further FIG. 8, an electric vehicle charging connector assembly 1 in accordance with the present invention is shown. When the plug connector 2 is docked with the receptacle connector 3, the first axle stand 212, the first annular wall 214 and the first inner ring base 213 of the plug connector 2 are respectively inserted into the fourth engaging groove 319, the third engaging groove 318 and the outer ring groove 315 of the receptacle connector 3, while the first conducting sleeve 251 and the second conducting sleeve 252 of the first electrode unit 2500 of the plug connector 2 are respectively inserted into the third engaging groove 318 and the fourth engaging groove 319 and are respectively in contact with the third conducting sleeve 351 and the fourth conducting sleeve 352 of the second electrode unit 3500 of the receptacle connector 3. In the meantime, the contact terminal 24 of the plug connector 2 is inserted into the outer ring groove 315 of the receptacle connector 3 to make the contact leg 2411 of the contact terminal 24 contact with the contact surface 3411 of each of the plurality of the docking terminals 34. The docking of the plug connector 2 and the receptacle connector 3 of the electric vehicle charging connector assembly 1 in accordance with the present invention is completed. For increasing a contacting elasticity between the first electrode unit 2500 and the second electrode unit 3500, a first spring ring 3140 and a second spring ring 3150 may be respectively disposed in the third engaging groove 318 and the fourth engaging groove 319.

Accordingly, the plurality of the contact terminal 24 of the plug connector 2 and the plurality of the docking terminal 34 of the receptacle connector 3 are respectively assembled with the first circuit board 22 and the second circuit board 32 in an elastically embedded manner so as to simplify manufacture procedures, capable of reducing working time and manufacturing cost as well as suitable for quantity production. The first jumper unit 25 of the plug connector 2 and the second jumper unit 35 of the receptacle connector 3 are respectively secured on the first electrode unit 2500 and the second electrode unit 3500 by a riveting way which allows a firm electrode connection and low probability of looseness between the plug connector 2 and the receptacle connector 3 so as to ensure a stability and accuracy of electricity transmission and a battery charge integrity. The waterproof ring 33 fully covers the outside of the second circuit board 32 to make the second circuit board 32 be entirely closed to the outside of the receptacle connector 3 so as to prevent water leakage into the receptacle connector 3 and also to ensure a stability and accuracy of electricity transmission and a battery charge integrity.

It is understood that the invention may be embodied in other forms within the scope of the claims. Thus the present examples and embodiments are to be considered in all respects as illustrative, and not restrictive, of the invention defined by the claims.

What is claimed is:

1. An electric vehicle charging connector assembly comprising a plug connector and a receptacle connector docking with the plug connector, wherein:
   the plug connector includes:
   a first insulating body having a first outer ring base and a first inner ring base inside the first outer ring base, the first inner ring base protruding towards the first outer ring base to form a plurality of columns extending longitudinally, each two of the plurality of the columns defining a guiding groove therebetween;
   a first circuit board disposed at a side of the first insulating body and having a plurality of first through holes each located corresponding to the guiding groove and having a plurality of first wire holes and a plurality of first wires penetrating through the plurality of the first wire holes;
   a plurality of contact terminals each having a first main section and a first fixed section, the first main section being inserted in the guiding groove, the first fixed section integrally extending from the first main section and being inserted in each of the plurality of the first through holes of the first circuit board;
   a first electrode unit including a first conducting sleeve and a second conducting sleeve, the first conducting sleeve being positively charged, the second conducting sleeve being negatively charged; and
   a first jumper unit electrically connected with the first electrode unit and including a first jumper body and a second jumper body;
   the receptacle connector includes:
   a second insulating body having a second outer ring base and an inner side of the second outer ring base defined with an outer ring groove, a retaining wall rising from a middle of the outer ring groove, the retaining wall extending laterally to form a stair surface, a plurality of slits are disposed on the stair surface;
   a second circuit board disposed at a side of the second insulating body and having a plurality of second through holes located corresponding to the plurality of the slits and having a plurality of second wire holes and a plurality of second wires penetrating through the plurality of the second wire holes;
   a plurality of docking terminals each having a second main section and a second fixed section, the second main section abutting on the retaining wall, the second fixed section integrally extending from the second main section and being inserted in each of the plurality of the second through holes of the second circuit board through each of the plurality of the slits;
   a second electrode unit including a third conducting sleeve and a fourth conducting sleeve, the third conducting sleeve being negatively charged, the fourth conducting sleeve being positively charged; and
   a second jumper unit electrically connected with the second electrode unit and including a third jumper body and a fourth jumper body.

2. The electric vehicle charging connector assembly as claimed in claim 1, wherein the first fixed section has two first elastic arms and a first hollow portion located between the two first elastic arms, the two first elastic arms and the first hollow portion corporately providing the first fixed section with an elasticity of compression to make the first fixed section penetrate though and fasten to each of the plurality of the first through holes of the first circuit board, and wherein the second fixed section has two second elastic arms and a second hollow portion located between the two second elastic arms, the two second elastic arms and the second hollow portion corporately providing the second fixed section with an elasticity of compression to make the second fixed section penetrate though and fasten to each of the plurality of the second through holes of the second circuit board.

3. The electric vehicle charging connector assembly as claimed in claim 1, wherein there are eight guiding grooves, eight first through holes, eight contact terminals, four first wire holes and four first wires, each two of the eight contact terminals being combined as one to electrically connect to each of the four first wires, and wherein there are eight slits, eight second through holes, eight docking terminals, four second wire holes and four second wires, each two of the eight docking terminals being combined as one to electrically connect to each of the four second wires.

4. The electric vehicle charging connector assembly as claimed in claim 1, wherein two opposite sides of the first outer ring base extend longitudinally to form a first positioning pillar and a second positioning pillar, and a first axle stand extends along a center axis of the first outer ring base, the first axle stand has a first top opening, a first ground element is inserted in the first axle stand through the first top opening, the first insulating body has a first annular wall located between the first outer ring base and the first inner ring base, a first engaging groove is defined between the first annular wall and the first inner ring base, a second engaging groove is defined between the first annular wall and the first axle stand, the first outer ring base extends outward to form a first extension base, the first extension base further extends outward in four directions to form four first support arms, a free end of each of the four first support arms has a first mounting hole adapted for external connections, and wherein two opposite sides of the second outer ring base extend longitudinally to form a third positioning pillar and a fourth positioning pillar, and a second axle stand extends along a center axis of the second outer ring base, the second axle stand has a second top opening, a second ground element is inserted in the second axle stand through the second top opening, the second insulating body has a second inner ring base located between the second axle stand and the second outer ring base, an inner ring groove is defined between the second inner ring base and the second axle stand, the second insulating body has a second annular wall located between the second axle stand and the second inner ring base, a third engaging groove is defined between the second annular wall and the second inner ring base, a fourth engaging groove is defined between the second annular wall and the second axle stand, the second outer ring base extends outward to form a second extension base, the second extension base further extends outward in four directions to form four second support arms, a free end of each of the four second support arms has a second mounting hole adapted for external connections.

5. The electric vehicle charging connector assembly as claimed in claim 4, wherein a first spring ring and a second spring ring are respectively disposed in the third engaging groove and the fourth engaging groove to provide an elastic contact between the first electrode unit and the electrode unit.

6. A plug connector, configured in a charging pile of a charging station, comprising:
   a first insulating body having a first outer ring base and a first inner ring base inside the first outer ring base, the first inner ring base protruding towards the first outer ring base to form a plurality of columns extending longitudinally, each two of the plurality of the columns defining a guiding groove therebetween;

a first circuit board disposed at a side of the first insulating body and having a plurality of first through holes each located corresponding to the guiding groove and having a plurality of first wire holes and a plurality of first wires penetrating through the plurality of the first wire holes;

a plurality of contact terminals each having a first main section and a first fixed section, the first main section being inserted in the guiding groove, the first fixed section integrally extending from the first main section and being inserted in each of the plurality of the first through holes of the first circuit board;

a first electrode unit including a first conducting sleeve and a second conducting sleeve, the first conducting sleeve being positively charged, the second conducting sleeve being negatively charged; and a first jumper unit electrically connected with the first electrode unit and including a first jumper body and a second jumper body.

7. The plug connector as claimed in claim 6, wherein the first fixed section has two first elastic arms and a first hollow portion located between the two first elastic arms, the two first elastic arms and the first hollow portion corporately providing the first fixed section with an elasticity of compression to make the first fixed section penetrate though and fasten to each of the plurality of the first through holes of the first circuit board.

8. The plug connector as claimed in claim 6, wherein there are eight guiding grooves, eight first through holes, eight contact terminals, four first wire holes and four first wires, each two of the eight contact terminals being combined as one to electrically connect to each of the four first wires.

9. The plug connector as claimed in claim 6, wherein the first outer ring base extends outward to form a first extension base, the first extension base further extends outward in four directions to form four first support arms, a free end of each of the four first support arms has a first mounting hole adapted for external connections, the first mounting hole is partially filled with a first gasket for facilitating the external connections, a first circular recess is defined between the first extension base and the first outer ring base and is filled with a first elastic ring for mechanical seal.

* * * * *